US005666652A

United States Patent [19]
Lin et al.

[11] Patent Number: 5,666,652
[45] Date of Patent: Sep. 9, 1997

[54] METHOD AND APPARATUS FOR CONTROLLING ZONE REGISTRATIONS IN A RADIO COMMUNICATION SYSTEM

[75] Inventors: Jyh-Han Lin, Keller; Jheroen Pieter Dorenbosch, Waxahachie; Robert Gary Goodman, Denton; James Alan Starkweather, Grapevine, all of Tex.

[73] Assignee: Motorola, Inc.

[21] Appl. No.: 606,901

[22] Filed: Feb. 26, 1996

Related U.S. Application Data

[63] Continuation-in-part of Ser. No. 502,996, Jul. 17, 1995.

[51] Int. Cl.$^6$ ..................................... H04Q 7/00
[52] U.S. Cl. ........................................ 455/435
[58] Field of Search ..................... 455/33.1, 33.2, 455/33.4, 54.1, 56.1; 379/58, 59, 60, 91, 114, 121

[56] References Cited

U.S. PATENT DOCUMENTS

| | | | |
|---|---|---|---|
| 4,644,347 | 2/1987 | Lucas et al. | 340/825.44 |
| 4,875,038 | 10/1989 | Siwiak et al. | 340/825.04 |
| 5,065,423 | 11/1991 | Gaskill | 379/57 |
| 5,212,822 | 5/1993 | Fukumine et al. | 455/33.1 |
| 5,291,543 | 3/1994 | Freese et al. | 379/59 |
| 5,305,466 | 4/1994 | Taketsugu | 455/33.1 |
| 5,436,956 | 7/1995 | Shiotsuki et al. | 379/60 |

*Primary Examiner*—Reinhard J. Eisenzopf
*Assistant Examiner*—M. D. Banks-Harold
*Attorney, Agent, or Firm*—R. Louis Breeden

[57] ABSTRACT

A method and apparatus controls zone registrations in a radio communication system providing radio coverage to a portable subscriber unit (122, 1200) within a plurality of zones (402). A fixed portion (102) of the radio communication system cooperates with the portable subscriber unit (122, 1200) to adjust at least one registration variable in a memory of the portable subscriber unit (122, 1200) for moderating the zone registrations. The portable subscriber unit (122, 1200) then moderates the zone registrations to a limited number in accordance with the at least one registration variable.

43 Claims, 12 Drawing Sheets

*400*

METHOD AND APPARATUS FOR CONTROLLING ZONE REGISTRATIONS IN A RADIO COMMUNICATION SYSTEM

This application is a continuation-in-part of application Ser. No. 08/502,996, filed Jul. 17, 1995, by Lin, entitled "Method and Apparatus for Controlling Zone Registrations in a Radio Communication System."

FIELD OF THE INVENTION

This invention relates in general to radio communication systems and more specifically to a zoned radio communication system providing control of registrations.

BACKGROUND OF THE INVENTION

In a two-way communication system, and particularly in a two-way messaging system; the coverage area is often divided into regions or zones. Such a zoned communication system advantageously allows frequency reuse for improved radio frequency spectrum efficiency. A communication system, divided in such a manner must either know beforehand the location of a subscriber to deliver a message thereto, or the system must search the entire coverage area for the subscriber before the message can be delivered. The search process can delay the delivery of the message. During periods of high traffic the delays can become unacceptable to some users. To facilitate the locating of subscribers, conventional systems have been designed such that subscriber units monitor the communication channel to detect movement from one zone to another zone and to automatically register with the new zone when a zone boundary crossing is detected. During periods of high traffic and high subscriber mobility the traffic generated by the registration requests can load a system to the point where long delays in message delivery are experienced. Zone crossing detection and automatic registration also is troubled with nuisance registrations from subscribers located stationary on a zone border, where because of signal fading, the zone crossing detection process can toggle between zones.

Thus what is needed is a method and apparatus for limiting the zone border crossing registrations, and nuisance registration requests from subscribers located stationary on a zone border. What is also needed is a method and apparatus for prioritizing border crossing registration of high usage subscribers, thereby minimizing the number of system wide searches.

SUMMARY OF THE INVENTION

An aspect of the present invention is a method of controlling zone registrations in a radio communication system providing radio coverage to a portable subscriber unit within a plurality of zones. The method comprises in a fixed portion of the radio communication system the steps of granting to the portable subscriber unit a predetermined amount of a movement credit in response to an occurrence of a predetermined communication activity associated with the portable subscriber unit, and accepting a limited number of the zone registrations from the portable subscriber unit. The limited number is determined by a tally of the movement credit granted to the portable subscriber unit, diminished by movement fees deducted in response to a zonal movement of the portable subscriber unit.

Another aspect of the present invention is a method of controlling zone registrations in a radio communication system providing radio coverage to a portable subscriber unit within a plurality of zones. The method comprises in the portable subscriber unit the steps of receiving a grant of a movement credit from a fixed portion of the radio communication system in response to an occurrence of a predetermined communication activity associated with the portable subscriber unit, and making a limited number of the zone registrations. The limited number is determined by a tally of the movement credit granted to the portable subscriber unit, diminished by movement fees deducted in response to a zonal movement of the portable subscriber unit.

A third aspect of the present invention is a controller for controlling zone registrations in a radio communication system providing radio coverage to a portable subscriber unit within a plurality of zones. The controller comprises a processing system for controlling operation of the controller, and a transmitter interface coupled to the processing system for sending information including a message to the portable subscriber unit. The controller further comprises a receiver interface coupled to the processing system for receiving information including a zone registration from the portable subscriber unit. The processing system is programmed for granting to the portable subscriber unit a predetermined amount of a movement credit in response to an occurrence of a predetermined communication activity associated with the portable subscriber unit, and accepting a limited number of the zone registrations from the portable subscriber unit. The limited number determined by a tally of the movement credit granted to the portable subscriber unit, diminished by movement fees deducted in response to a zonal movement of the portable subscriber unit.

A fourth aspect of the present invention is a portable subscriber unit for controlling zone registrations in a radio communication system providing radio coverage to the portable subscriber unit within a plurality of zones. The portable subscriber unit comprises a receiver for receiving a grant of a movement credit from a fixed portion of the radio communication system in response to an occurrence of a predetermined communication activity associated with the portable subscriber unit, and a processor coupled to the receiver for receiving information including the grant of the movement credit therefrom. The portable subscriber unit further comprises a memory coupled to the processor for storing software and operating variables utilized by the processor, including a tally of the movement credit granted to the portable subscriber unit, diminished by movement fees deducted in response to a zonal movement of the portable subscriber unit. The portable subscriber unit also includes a transmitter coupled to the processor for transmitting a zone registration message to the fixed portion of the radio communication system. The processor is programmed for controlling the transmitter to make a limited number of the zone registrations, the limited number determined by the tally of the movement credit.

A fifth aspect of the present invention is a method of controlling zone registrations in a radio communication system providing radio coverage to a portable subscriber unit within a plurality of zones. The method comprises in the portable subscriber unit the steps of adjusting at least one registration variable in a memory of the portable subscriber unit for moderating the zone registrations, and moderating the zone registrations to a limited number in accordance with the at least one registration variable.

A sixth aspect of the present invention is a portable subscriber unit for controlling zone registrations in a radio communication system providing radio coverage to the portable subscriber unit within a plurality of zones. The portable subscriber unit comprises a receiver for receiving information from a fixed portion of the radio communication system, and a processor coupled to the receiver for processing the information. The portable subscriber unit further comprises a memory coupled to the processor for storing software and operating variables utilized by the processor, including at least one registration variable; and a transmitter coupled to the processor for transmitting the zone registrations to the fixed portion of the radio communication system. The processor is programmed for adjusting the at least one registration variable for moderating the zone registrations, and moderating the zone registrations to a limited number in accordance with the at least one registration variable.

DETAILED DESCRIPTION OF THE DRAWINGS

According to the first and second embodiments of the present invention, unnecessary system traffic associated with registration and tracking of subscribers in a zoned communication system is controlled through a system of credits and fees. More credits are given to high traffic users and fewer credits are given to low traffic users. The high traffic users, being given more credit can afford to pay registration fees associated with entering a new zone, thus allowing the system to maintain a record of their location. Low volume users, being unable to pay the registration fee, are restricted from multiple registrations and are therefore prevented from generating unnecessary registration traffic.

According to the third embodiment of the present invention, unnecessary system traffic associated with registration and tracking of subscribers in a zoned communication system is controlled by suppressing registration of subscribers who are moving rapidly through several zones. The registration preferably is suppressed by delaying registration until a subscriber has remained in the same zone for longer than a predetermined delay period.

Figure 1:
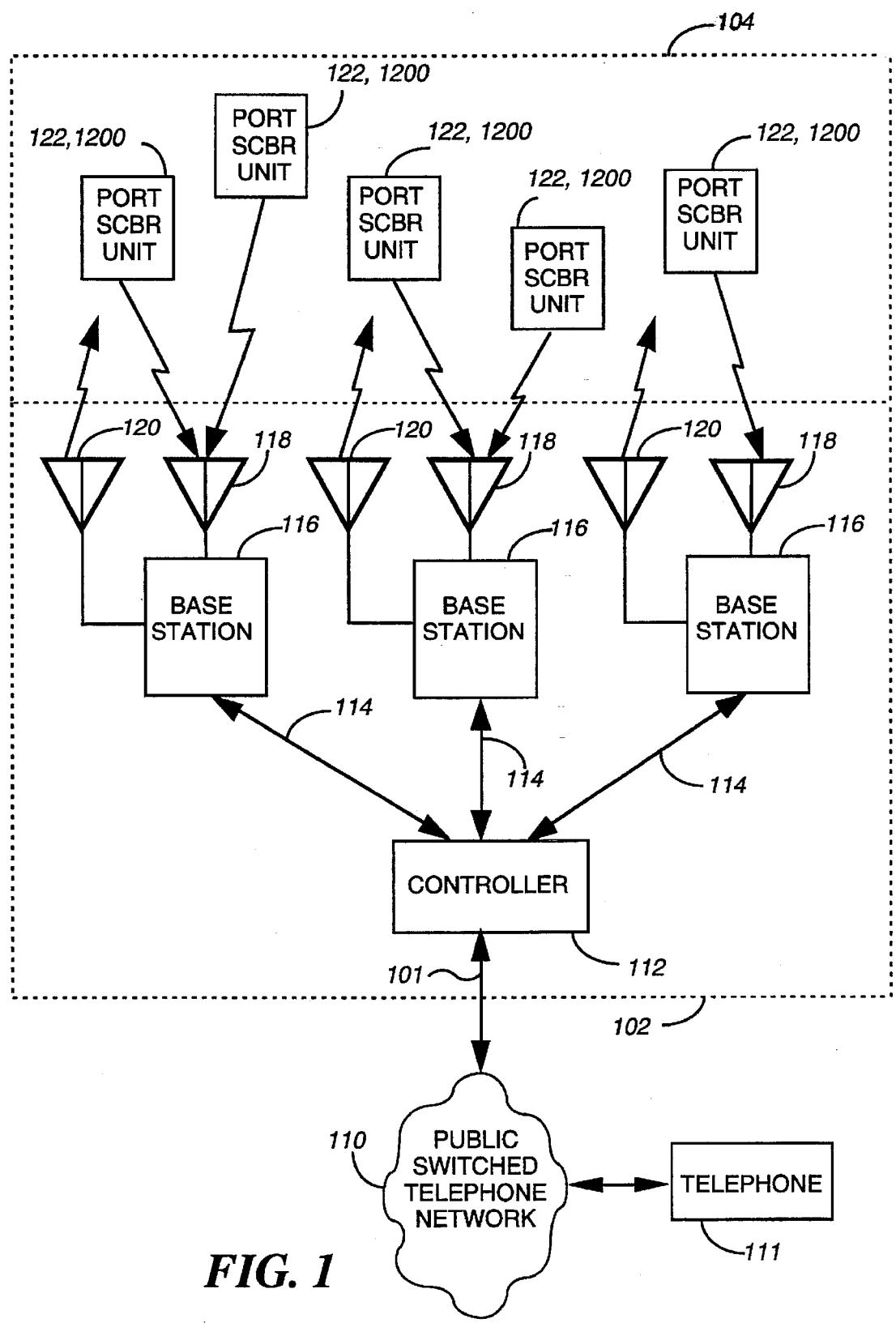
FIG. 1 is an electrical block diagram of a communication system in accordance with the present invention.

Referring to FIG. 1, an electrical block diagram of a communication system in accordance with the present invention comprises a fixed portion 102 and a portable portion 104. The fixed portion 102 comprises a plurality of conventional base transceivers which are base stations 116 coupled by communication links 114 to a controller 112 for controlling the base stations 116. The hardware of the controller 112 is preferably a combination of the Wireless Messaging Gateway (WMG™) Administrator! paging terminal and the RF-Conductor!™ message distributor manufactured by Motorola, Inc. of Schaumburg, Ill. The hardware of the base stations 116 is preferably similar to the Nucleus™ Orchestra! manufactured by Motorola, Inc. of Schaumburg, Ill. Other similar hardware can be utilized as well for the controller 112 and base stations 116. The Controller 112 comprises a plurality of firmware elements in accordance with the present invention, as will be described further below.

Each of the base stations 116 transmits radio signals to the portable portion 104 comprising a plurality of portable subscriber units 122, 1200 via a transmitting antenna 120. The base stations 116 each receive radio signals from the plurality of portable subscriber units 122, 1200 via a receiving antenna 118. The radio signals comprise selective call addresses and messages transmitted to the portable subscriber units 122, 1200 and acknowledgments received from the portable subscriber units 122, 1200. It will be appreciated that the portable subscriber units 122, 1200 can also originate messages other than acknowledgments. The controller 112 preferably is coupled to a conventional telephone 111 via telephone links 101 and a public switched telephone network (PSTN) 110 for receiving selective call originations therefrom. Selective call originations comprising voice and data messages from the PSTN 110 can be generated, for example, from the conventional telephone 111 coupled to the PSTN 110 in a mariner that is well known in the art.

Data and control transmissions between the base stations 116 and the portable subscriber units 122, 1200 preferably utilize a well-known digital selective call signaling protocol, such as the Motorola FLEX™ family of protocols. It will be appreciated that other similar protocols can be utilized as well. These protocols utilize well-known error detection and error correction techniques and are therefore tolerant to bit errors occurring during transmission, provided that the bit errors are not too numerous in any one code word.

Outbound channel transmissions comprising data and control signals from the base stations 116 preferably utilize two- and four-level frequency shift keyed (FSK) modulation, operating at sixteen-hundred or thirty-two-hundred symbols-per-second (sps), depending on traffic requirements and system transmission gain. Inbound channel transmissions from the portable subscriber units 122, 1200 to the base stations 116 preferably utilize four-level FSK modulation at a rate of ninety-six-hundred bits per second (bps). Inbound channel transmissions preferably occur during predetermined data packet time slots synchronized with the outbound channel transmissions. It will be appreciated that, alternatively, other signaling protocols, modulation schemes, and transmission rates can be utilized as well for either or both transmission directions. The outbound and inbound channels preferably operate on a single carrier frequency utilizing well-known time division duplex (TDD) techniques for sharing the frequency. It will be appreciated that, alternatively, frequency division duplex (FDD) can be utilized as well for the outbound and inbound channels.

U.S. Pat. No. 4,875,038 to Siwiak et al., which describes a prior art acknowledge-back selective call communication system, is hereby incorporated herein by reference. For further information on the operation and structure of an acknowledge-back selective call communication system, please refer to the Siwiak et al. patent.

Figure 2:
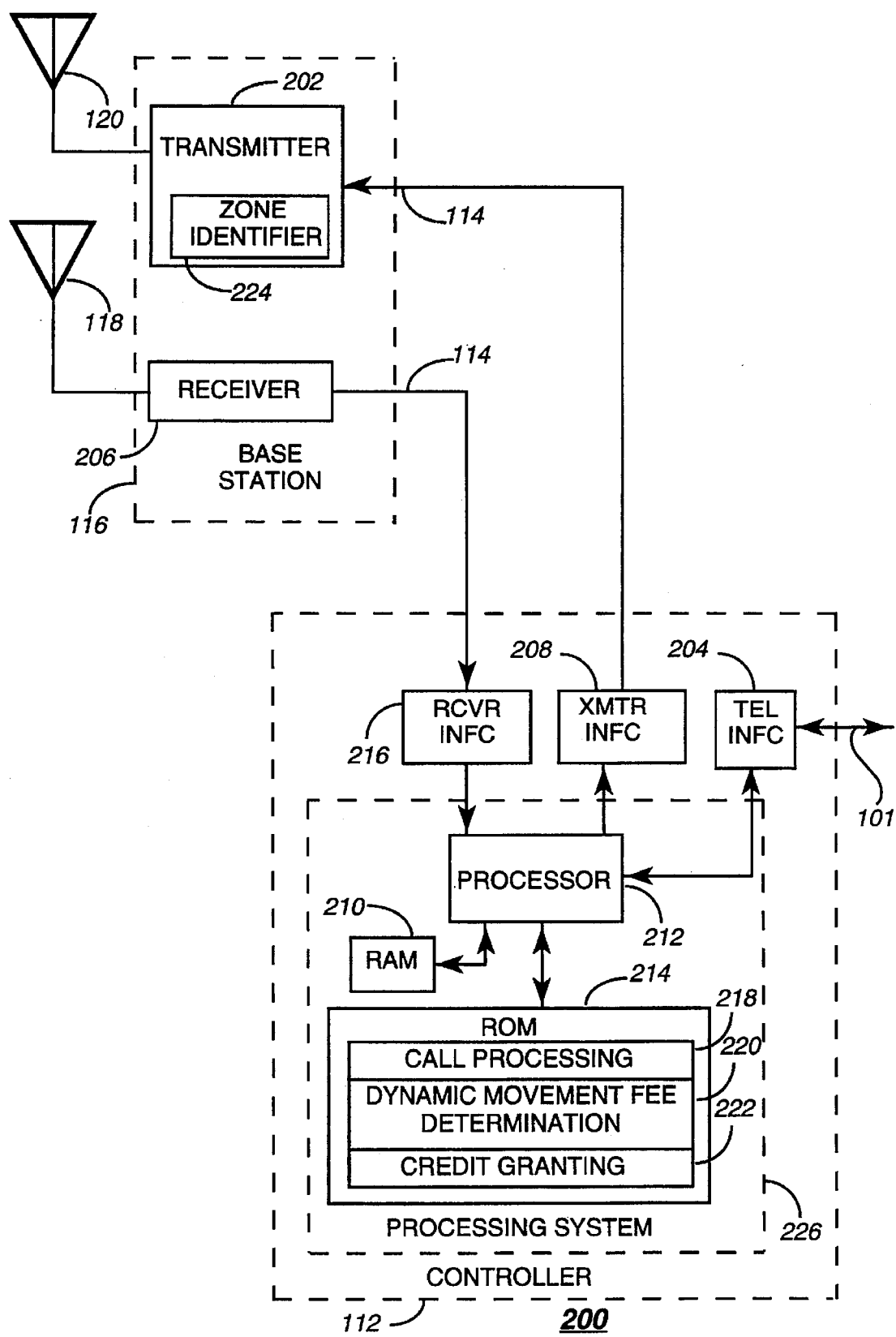
FIG. 2 is an electrical block diagram of portions of a controller and base station in accordance with first and second embodiments of the present invention.

Referring to FIG. 2, an electrical block diagram 200 of portions of the controller 112 and base station 116 in accordance with first and second embodiments of the present invention shows that the controller 112 comprises a processing system 226 for directing operation of the controller 112. The processing system 226 includes a processor 212 that is preferably coupled through a transmitter interface 208 to a transmitter 202, both utilizing conventional techniques well known in the art. The transmitter 202 preferably transmits two- and four-level FSK data messages to the portable subscriber units 122, 1200. Also preferably, the transmitter 202 comprises a zone identifier 224 stored within a non-volatile memory thereof for identifying a coverage zone in which the transmitter operates. The zone identifier 224 is preferably a non-zero value unique to the zone in which the transmitter 202 is located. In accordance with the present invention, the controller 112 also instructs the transmitter 202 to broadcast a zone boundary crossing fee 336, a registration fee 338, a movement credit 340, a credit limit 342 and a credit decay rate 344 as described below in regard to FIG. 3. The zone boundary crossing fee 336 is also referred to herein below as a crossing fee 336.

The processor 212 is also coupled through a conventional receiver interface 216 to at least one acknowledgment receiver 206 using conventional binary FSK demodulation. The acknowledgment receiver 206 can be collocated with the base stations 116, as implied in FIG. 2, but preferably is positioned remote from the base stations 116 to avoid interference from the transmitter 202. The acknowledgment receiver 206 is for receiving one or more acknowledgments from the plurality of portable subscribed units 122, 1200. In addition, the processor 212 is coupled through a telephone interface 204 to the telephone links 101 and thence to the PSTN 110 for receiving message originations therefrom.

The processor 212 is coupled to a random access memory (RAM) 210 for storing messages to be transmitted to the portable subscriber units 122, 1200, and for storing messages received from the portable subscriber units 122, 1200. The processor 212 also is coupled to a read-only memory (ROM) 214 comprising firmware elements for use by the processor 212. It will be appreciated that other types of memory, e.g., electrically erasable programmable ROM (EEPROM) or magnetic disk memory, can be utilized as well for the ROM 214 or RAM 210. It will be further appreciated that the RAM 210 and the ROM 214, singly or in combination, can be integrated as a contiguous portion of the processor 212. Preferably, the processing system 226 is a conventional, commercially available computer system such as a VME Sparc processor system manufactured by Sun Microsystems, Inc. It will be appreciated that other similar processors can be utilized as well for the processing system 226, and that additional processing systems of the same or alternative type can be added as required to handle the processing requirements of the controller 112.

The firmware elements of the controller 112 comprise a call processing element 218 for processing calls in a manner well known in the art. The firmware elements further comprise a dynamic movement fee determination element 220 and a credit granting element 222 in accordance with the first and second embodiments of the present invention. The dynamic movement fee determination element 220 and the credit granting element 222 determine the zone boundary crossing fee 336, the registration fee 338, the movement credit 340, the credit limit 342 and the credit decay rate 344 based on system traffic parameters as described below.

Figure 3:
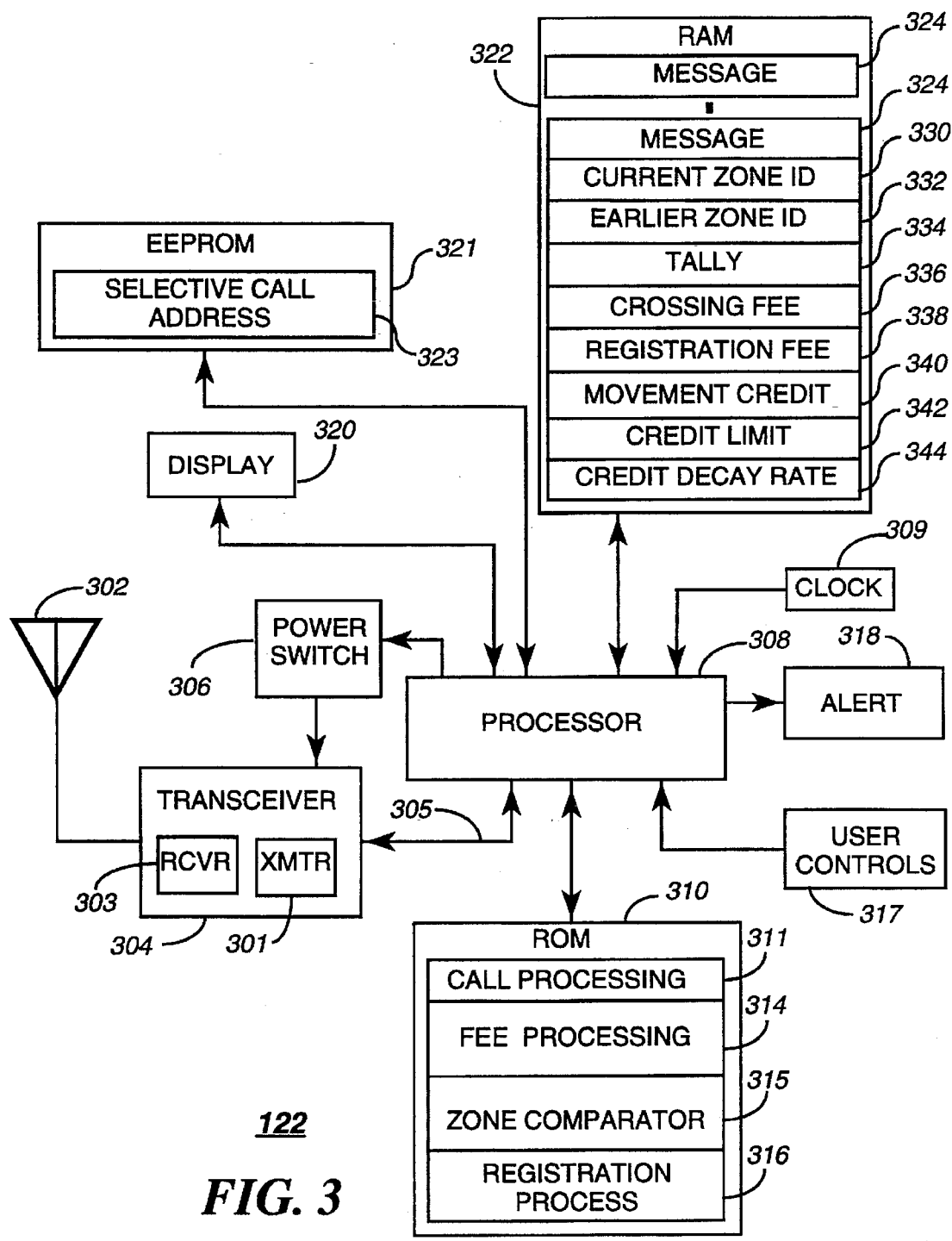
FIG. 3 is an electrical block diagram of a portable subscriber unit in accordance with the first and second embodiments of the present invention.

Referring to FIG. 3, an electrical block diagram depicts the portable subscriber unit 122 in accordance with the first and second embodiments of the present invention. The portable subscriber unit 122 comprises a transceiver antenna 302 for transmitting and intercepting radio signals to and from the base stations 116. The radio signals linked to the transceiver antenna 302 are coupled to a transceiver 304 comprising a conventional transmitter 301 and receiver 303. The radio signals received from the base stations 116 use conventional two and four-level FSK. It will be appreciated by one of ordinary skill in the art that the transceiver antenna 302 is not limited to a single antenna for transmitting and receiving radio signals. Separate antennas for receiving and transmitting radio signals would also be suitable.

Radio signals received by the transceiver 304 produce demodulated information at the output. The demodulated information is transferred over a signal information bus 305 which is coupled to the input of a processor 308, which processes the information in a manner well known in the art. Similarly, acknowledge response messages are processed by the processor 308 and delivered through the signal information bus 305 to the transceiver 304. The acknowledge response messages transmitted by the transceiver 304 are preferably modulated using four-level FSK operating at a bit rate of ninety-six-hundred bps. It will be appreciated that, alternatively,. other bit rates and other types of modulation can be used as well.

A conventional power switch 306, coupled to the processor 308, is used to control the supply of power to the transceiver 304, thereby providing a battery saving function. A clock 309 is coupled to the processor 308 to provide a timing signal used to time various events as required in accordance with the present invention. The processor 308 also is coupled to a electrically erasable programmable read only memory (EEPROM) 321 which comprises at least one selective call address 323 assigned to the portable subscriber unit 122 and used to implement the selective call feature. The processor 308 also is coupled to a random access memory (RAM) 322 for storing the following: a message in a plurality of message storage locations 324, the current zone identifier 330 corresponding to the last zone identifier 224 received, the earlier zone identifier 332 corresponding to a previously received zone identifier 224, the zone boundary crossing fee 336 last received, the registration fee 338 last received, the movement credit 340 last received, the credit limit 342 last received, the Credit decay rate 344 last received and a tally 334. The current zone identifier 330 and the earlier zone identifier 332 are described below. The tally 334 is used to store the current amount of movement credit remaining. The determination of the amount of movement credit and the functions of the zone boundary crossing fee 336, the registration fee 338, the movement credit 340, the credit limit 342 and the credit decay rate 344 will be described below.

The processor 308 also is coupled to a read-only memory (ROM) 310 comprising firmware elements for use by the processor 308. The firmware elements comprise a call processing element 311 for handling of incoming messages on the outbound channel using techniques well known in the art. The call processing element 311 further comprises routines to determine the current zone that the portable subscriber unit 122 is located in and procedures for updating the current zone identifier 330. When the current zone identifier 330 is updated, the processor 308 executes instructions in a firmware element, zone comparator 315, and compares the current zone identifier 330 with the earlier zone identifier 332, to determine If a zone boundary has been crossed. When the current zone identifier 330 does not equal the earlier zone identifier 332, a boundary has been crossed and the value of the earlier zone identifier 332 is replaced with the value of the current zone identifier 330, in preparation for the next comparison. In addition, the firmware elements, fee processing 314, and registration process 316 are executed as described below.

When an address is received by the processor 308, the call processing element 311 compares the received address with the at least one selective call address 323, and when a match is detected, a call alerting signal is generated to alert a user that a message has been received. The call alerting signal is directed to a conventional audible or tactile alert device 318 coupled to the processor 308 for generating an audible or tactile call alerting signal. In addition, the call processing element 311 processes the message which preferably is received in a digitized conventional manner, and then stores the message in the message storage location 324 in the RAM 322. The message can be accessed by the user through conventional user controls 317 coupled to the processor 308, for providing functions such as reading, lodking, and deleting a message. For reading a message a display 320, e.g., a conventional liquid crystal display (LCD), preferably also is coupled to the processor 308. It will be appreciated that other types of memory, e.g., EEPROM, can be utilized as well for the ROM 310 or RAM 322.

The processor 308 preferably is implemented utilizing a microcomputer similar to the MC68HC05 series microcomputer, manufactured by Motorola, Inc. of Schaumburg, Ill. It will be appreciated that other similar microcomputers can be used as well for the processor 308, and that the ROM 310, the RAM 322, and/or the EEPROM 321 also can be included as a portion of the processor 308.

Figure 4:
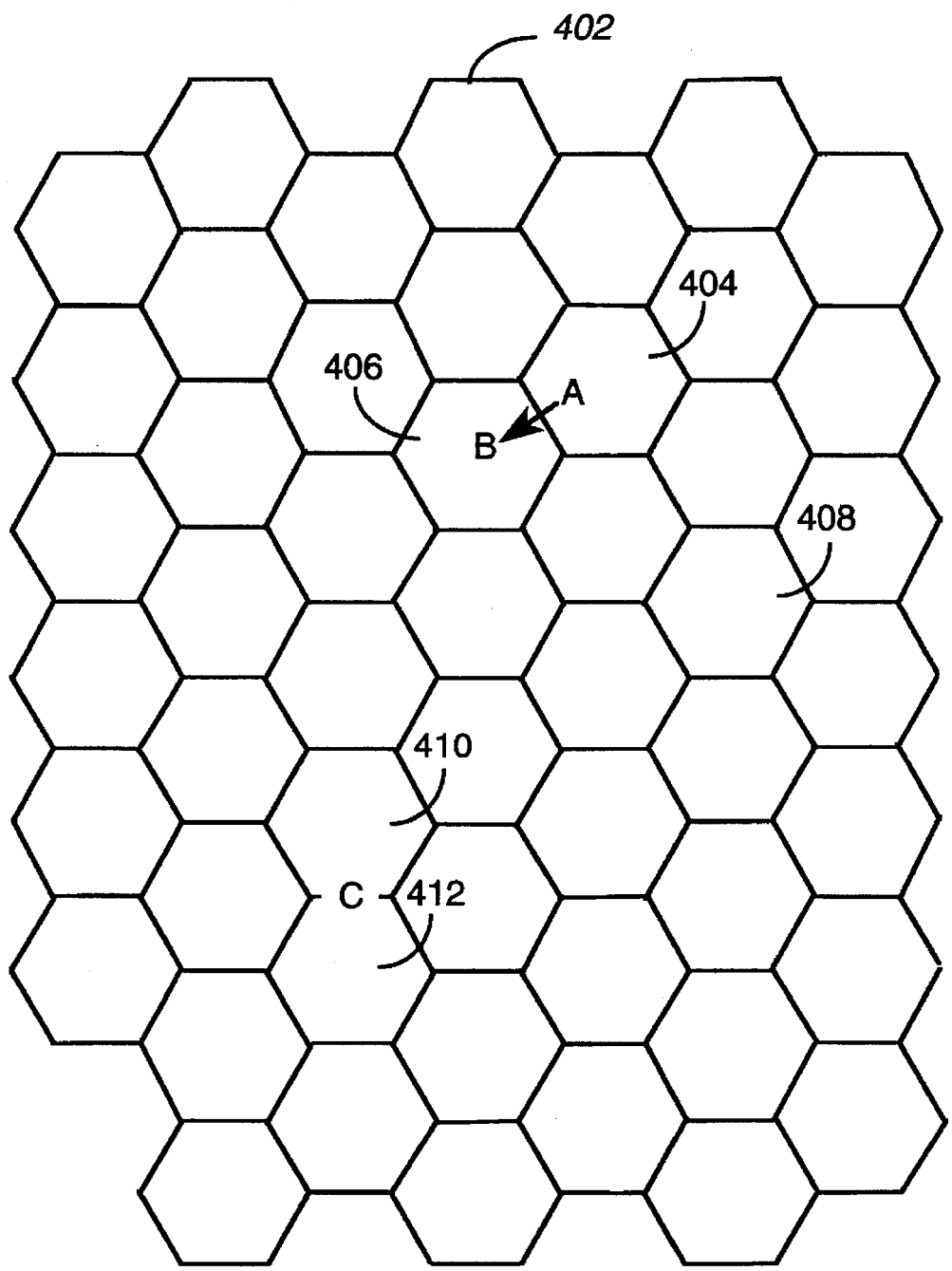
FIG. 4 depicts a coverage area partitioned into coverage zones in accordance with the present invention.

FIG. 4 depicts a coverage area 400 partitioned into zones in accordance with the present invention. Communication systems are often divided into regions or zones. Such zoned communication systems allows for frequency reuse. The concept of frequency reuse can be appreciated by studying coverage area 400. The coverage area 400 is divided into a number of hexagonal shaped zones. Located near the geometric center of radio coverage of each typical hexagonal zone 402, is the base station 116 along with the associated transmitting antenna 120 and receiving antenna 118. The power level and antenna gain is set such that the area of coverage of a given base station is essentially limited to a area slightly larger than the intended typical hexagonal zone 402. It will be appreciated that a number of conditions, beyond the control of the communications system designer, will cause the zones to be somewhat irregularly shaped. It can be seen that if the area of coverage of is limited as described above, a portable subscriber unit 122 located in zone 410, for example, can be communicating with the base station 116 located in zone 410 at the same time and on the same frequency as a second portable subscriber unit 122 located in zone 408, for example, is communicating with a second base station 116 located in zone 408. It will be further appreciated that some systems may subdivide the zones into subzones, which may then be subdivided even further. Throughout this patent application the term "zone" should be considered to be synonymous and interchangeable with "subzone".

Before the fixed portion 102 can originate communication with a portable subscriber unit 122 in the zoned communication system, the fixed portion 102 must know the zone in which the portable subscriber unit 122 is located. The fixed portion 102 relies on the portable subscriber unit 122 to register when the portable subscriber unit 122 crosses a zone boundary, as is the case when the portable subscriber unit 122 moves from point A located in zone 404 to point B in zone 406. Crossing a zone boundary is also called a zonal movement. When the fixed portion 102 has a message to deliver to a portable subscriber unit 122 but has not recorded the location of the portable subscriber unit 122 through a registration thereof, the fixed portion 102 proceeds with a series of broadcasts requesting the portable subscriber unit 122 to respond. By observing which base station 116 receives the response the fixed portion 102 can determine the location of the portable subscriber unit 122. A zone crossing registration request from a subscriber unit 122 that does not receive a message before the next zone boundary crossing generates useless registration traffic. Also, an unregistered high traffic portable subscriber unit 122 can cause the fixed portion 102 to process a considerable volume of traffic in an attempt to locate the portable subscriber unit 122. In accordance with the present invention, the registrations from the low traffic portable subscriber unit 122 advantageously are limited, while the high traffic users are allowed to register more freely. The manner in which the registrations are controlled is described below.

According to the first and second embodiments of the present invention, a credit equal to the movement credit 340 is granted each time a message is received by the portable subscriber unit 122. The portable subscriber unit 122 adds the credit to the tally 334. The portable subscriber unit 122 is charged two types of movement fees associated with crossing the zone border while moving, for example, from point A located in zone 404 to point B in zone 406. When a zone boundary is crossed the portable subscriber unit 122 is charged the zone boundary crossing fee 336, i.e., the zone boundary crossing fee 336 is subtracted from the tally 334. Before the portable subscriber unit 122 is allowed to attempt to register in zone 406 the portable subscriber unit 122 must have accumulated in the tally 334 a sufficient amount of credit to pay the registration fee 338. If there is insufficient credit in the tally 334 then registration is deferred.

In the case where the portable subscriber unit 122 is located stationary on the border between two zones, as is the case of the portable subscriber unit 122 located at point C shown in FIG. 4 on the border between zone 410 and zone 412, uncertainties in the zone determining process (a portion of the call processing element 311) can cause the detected location to toggle between zone 410 and zone 412. In a zoned communication system without the advantages of this invention the portable subscriber unit 122 would continue to register with each zone 410, 412 as its location was detected, generating a large quantity of unnecessary nuisance registration traffic. According to the first and second embodiments of the present invention, the portable subscriber unit 122 is required to pay the zone boundary crossing fee 336 every time a toggle between zone 410 and zone 412 occurs. Preferably, the system provides some delay, e.g. two minutes, in the execution of the registration process 316, allowing time for the subscriber unit 122 to expend, through the zone boundary crossing fee 336, the total amount of credit in the tally 334 before a large amount of unnecessary registration traffic is generated.

According to the first and second embodiments of the present invention, a limit is imposed on the maximum amount of credit allowed in the tally 334. This credit limit 342 is calculated by the system in a manner described below in reference to FIG. 7. Once the tally 334 reaches the value of the credit limit 342 no additional credit is added to the tally 334. In addition to the credit limit 342, the amount of credit in the tally 334 is caused to decay over time, further controlling the amount of credit in the tally 334. The credit decay rate 344 is the amount of credit that is deducted from the tally 334 each hour. The tally 334 is not allowed to decay below zero credit. The calculation of the credit decay rate 344 is also described below.

Figure 5:
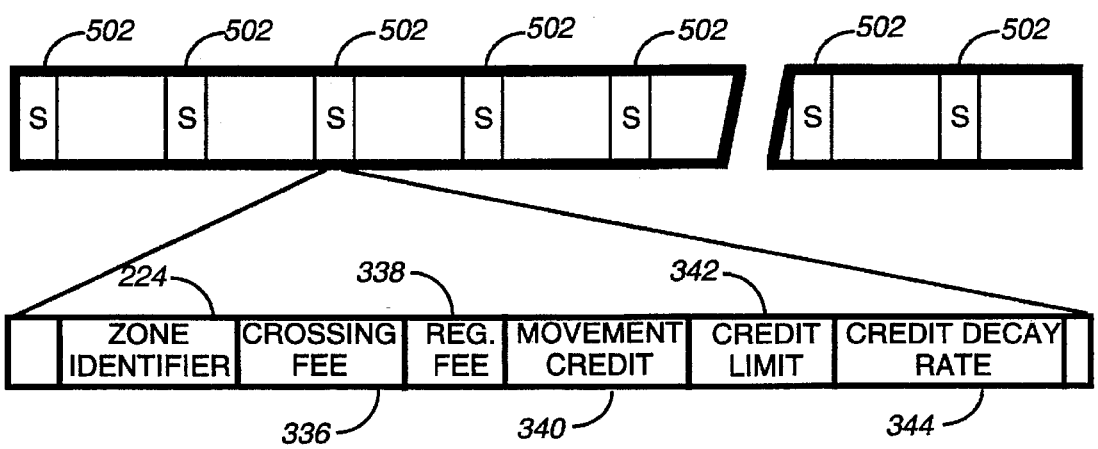
FIG. 5 is a timing diagram depicting events that occur during a transmission from the fixed portion in accordance with the first and second embodiments of the present invention.

FIG. 5 is a timing diagram 500 depicting events that occur during a transmission from the base station 116 to the portable subscriber unit 122, located within in the same zone as the base station 116, in accordance with the first and second embodiments of the present invention. As stated above the base station 116 broadcasts a message containing the zone identifier 224 that identifies the zone associated with the base station 116, the zone boundary crossing fee 336, indicating the current amount to be charged for every zone boundary crossing, the registration fee 338, indicating the current amount to be charged for every registration, and the movement credit 340 indicating the current amount to be granted for every message received by the portable subscriber unit 122. The timing diagram 500 shows the message being transmitted by the base station 116 having a series of synchronization blocks 502 with the zone identifier 224, the zone boundary crossing fee 336, the registration fee 338, the movement credit 340, the credit limit 342 and the credit decay rate 344 imbedded. It will be appreciated that, alternatively, other message formats can be used as well.

Figure 6:
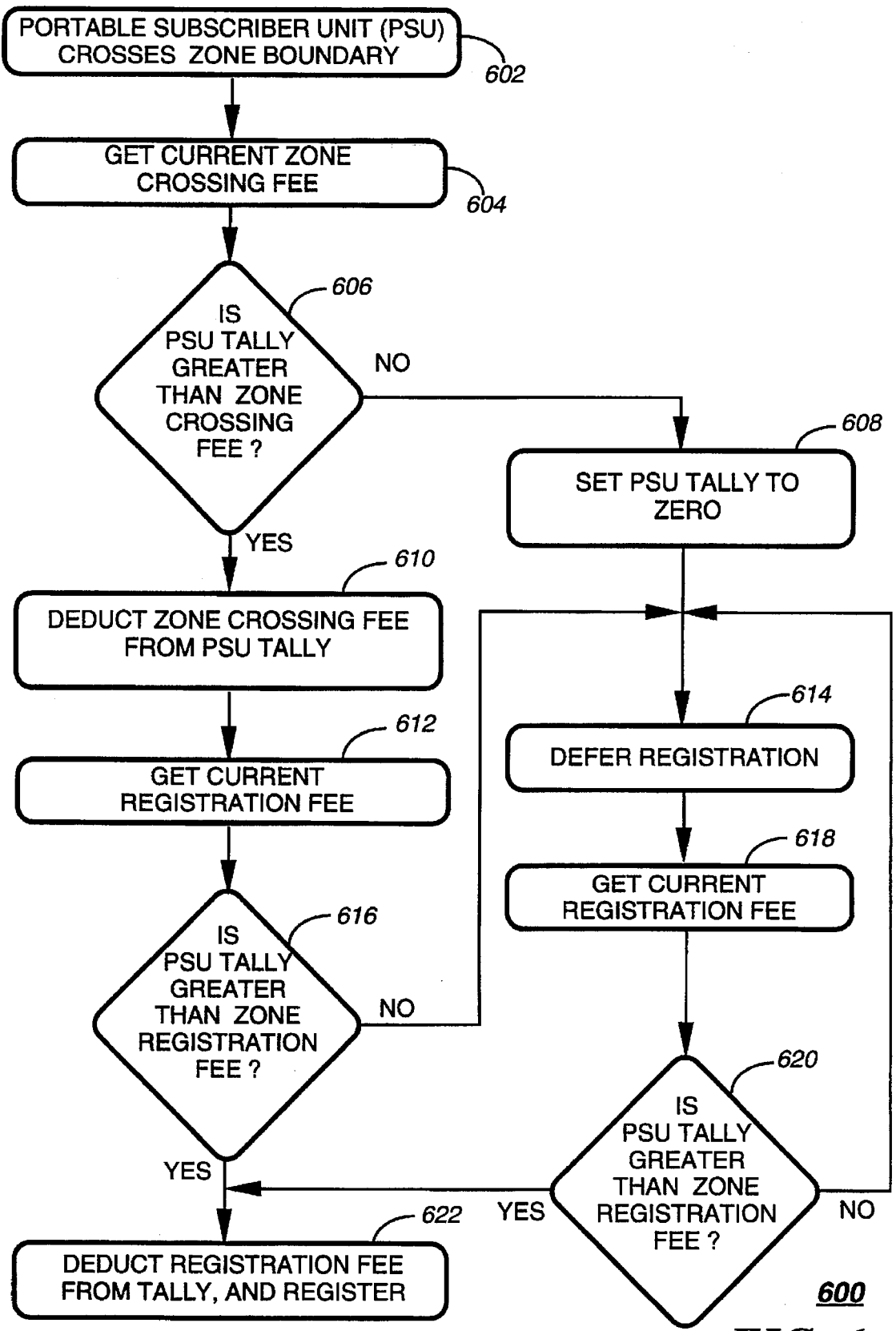
FIG. 6 is a flow chart depicting operation of the portable subscriber unit while crossing a zone border in accordance with the first and second embodiments of the present invention.

FIG. 6 is a flow chart 600 depicting operation of the portable subscriber unit 122 while crossing a zone border in accordance with the first and second embodiments of the present invention. The process starts with step 602 when the portable subscriber unit 122 crosses a zone boundary. Then in step 604 the processor 308 gets the zone boundary crossing fee 336 stored in the RAM 322. In step 606 the processor compares the zone boundary crossing fee 336 with the amount stored in the tally 334. When the amount stored in the tally 334 is greater than the zone boundary crossing fee 336, the processor 308 deducts the zone boundary crossing fee 336 from the tally 334 in step 610. In step 612 the processor 308 gets the registration fee 338 stored in the RAM 322. In step 616 the processor 308 compares the registration fee 338 with the amount stored in the tally 334. When the amount stored in the tally 334 is greater than the registration fee 338, the processor 308, in step 622, deducts the registration fee 338 from the amount stored in the tally 334 and proceeds to register with the system, using the registration process 316.

However, when in step 606 the amount stored in the tally 334 is less than the zone boundary crossing fee 336, the processor 308, in step 608, sets the tally 334 to zero. Then in step 614 the processor 308 defers registration for a predetermined length of time. This allows the portable subscriber unit 122 either to increase the tally 334 (e.g., by receiving a message) or for the registration fee 338 to change. In step 618 the processor 308 gets the latest registration fee 338 stored in the RAM 322. In step 620 the processor 308 compares the registration fee 338 with the amount stored in the tally 334. When the amount stored in the tally 334 is greater than the registration fee 338 being charged by the system, the processor 308 goes to step 622 described above and registers. When the amount stored in the tally 334 is less than the registration fee 338 being charged by the system, the processor 308 goes to step 614 described above, deferring registration. In a similar manner in step 616 when the amount stored in the tally 334 is less than the registration fee 338 being charged by the system, the processor 308 in step 616 goes to step 614 described above, deferring registration.

Figure 7:
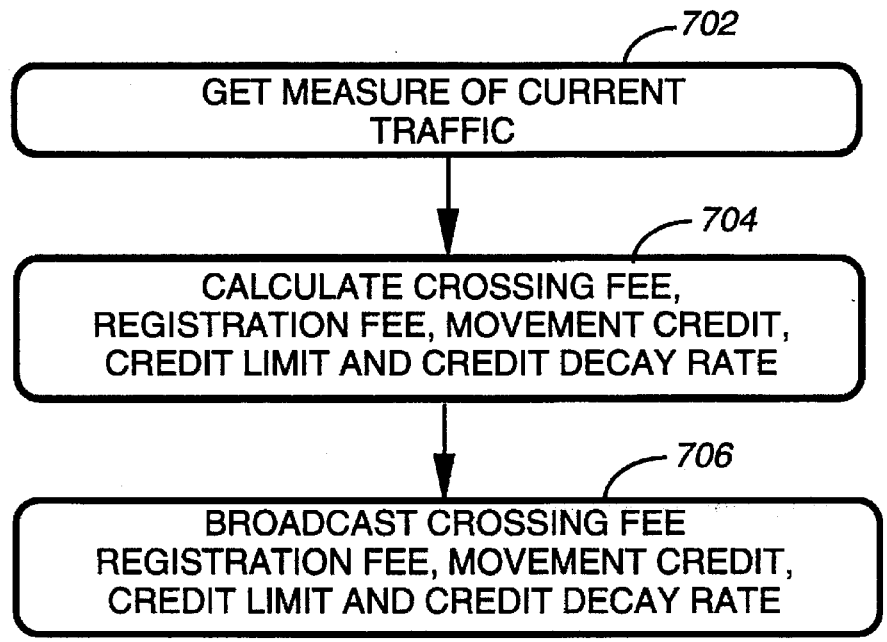
FIG. 7 is a flow chart depicting operation of the fixed portion while calculating and transmitting movement fees and a movement credit in accordance with the first embodiment of the present invention.

FIG. 7 is a flow chart 700 depicting operation of the fixed portion 102 while dynamically determining and transmitting movement fees and the movement credits 340, by the dynamic movement fee determination element 220, in accordance with the first embodiment of the present invention. The process starts with step 702 with the controller 112 extracting a measure of system traffic (e.g., a percentage of total system capacity) and other related parameters from processes being performed when the controller 112 is executing the call processing element 218. The other related parameters comprise, for example, the time of day and the day of the week. Next, in step 704 the controller 112 analyzes the measure of system traffic and other related parameters (e.g., the system traffic exceeds fifty percent of the total system capacity) to determine whether to allow more registrations by lowering the zone boundary crossing fee 336 and the registration fee 338 relative to the movement credit 340 that is granted for each message received. On the other hand, depending on the traffic and other related parameters, in step 704 the controller 112 can restrict registration by increasing the zone boundary crossing fee 336 and the registration fee 338 relative to the movement credit 340 that is granted.

The credit limit 342 is determined by the system based on a system wide average of the messages per day per subscriber. For example, the credit limit 342 will equal the movement credit 340 times the system wide average of the messages per day per subscriber times an empirically determined limit factor. The limit factor is determined by observing system performance and adjusting the limit factor accordingly. Preferably, the limit factor will be in the range of 2 to 8. The credit decay rate 344 is determined in a similar manner. For example, the credit decay rate 344 will equal the movement credit 340 times the system wide average of the messages per hour per subscriber times an empirically determined decay factor. The decay factor is determined by observing system performance and adjusting the decay factor accordingly. Preferably the decay factor will be in the range of one sixteenth to one half.

It will be appreciated that the parameters controlling the changes Go the zone boundary crossing fee 336, the registration fee 338, the movement credit 340, the credit limit 342 and the credit decay rate 344 can be adjusted during the tuning of a installation. It will also be appreciated that in some systems one or more of the parameters may remain fixed. It will be further appreciated that alternatively other methods can be used to determine the value of these parameters. Once the controller 112 determines the appropriate values for the zone boundary crossing fee 336, the registration fee 338, the movement credit 340, the credit limit 342 and the credit decay rate 344 the controller 112 instructs the base station 116 to broadcast the fees, credit, credit limit and decay rate to update the portable subscriber unit 122.

Figure 8:
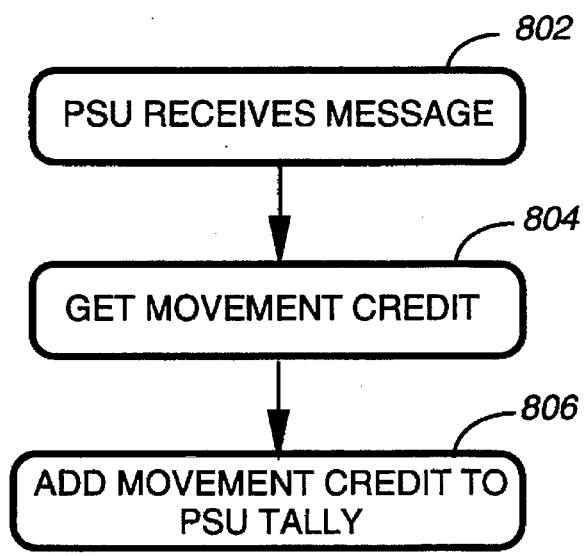
FIG. 8 is a flow chart depicting operation of the portable subscriber unit while issuing movement credit in accordance with the first embodiment of the present invention.

FIG. 8 is a flow chart 800 depicting operation of the portable subscriber unit 122 while issuing movement credit in accordance with the first embodiment of the present invention. When a message is received in step 802, the processor 308 in step 804 gets the movement credit 340 that was previously broadcast by the base station 116. Next in step 808 the processor 308 adds an amount corresponding to the movement credit 340 to the tally 334.

Figure 9:
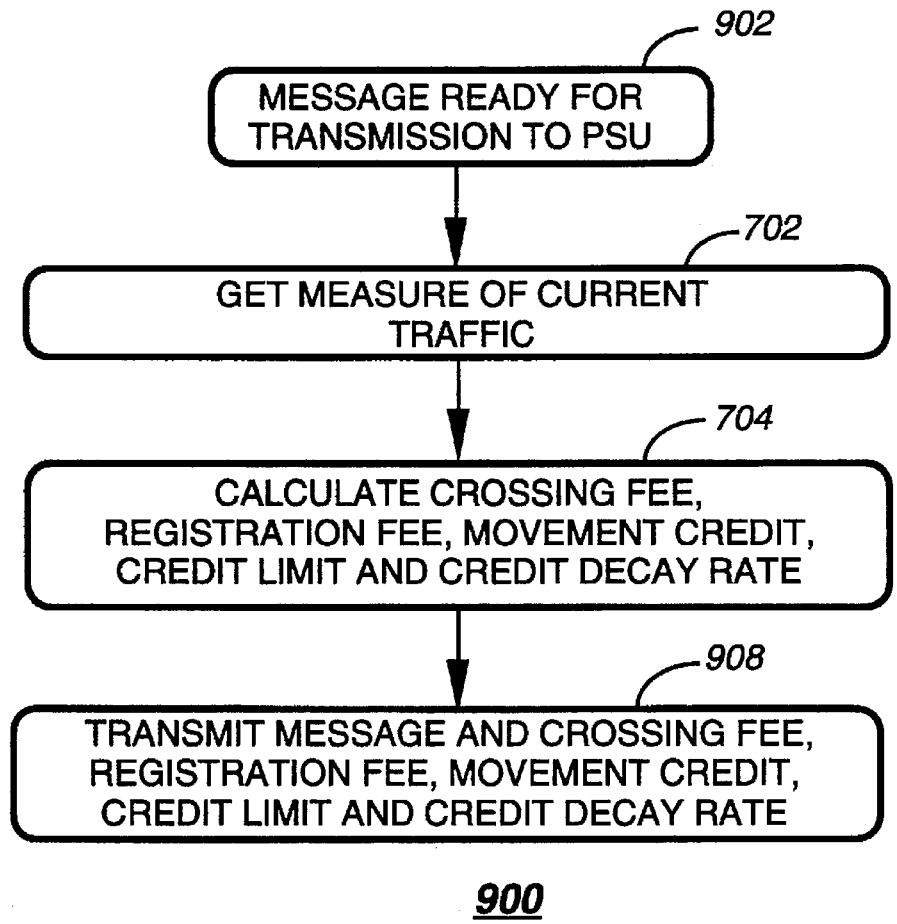
FIG. 9 is a flow chart depicting operation of the fixed portion while issuing movement credit in accordance with the second embodiment of the present invention.

FIG. 9 is a flow chart 900 depicting operation of the fixed portion while issuing movement credit in accordance with the second embodiment of the present invention. In this embodiment the process starts when the controller 112 is ready to transmit a message to the portable subscriber unit 122, in step 902. Then in step 702 the controller get a measure of system traffic and other related parameters as described above. Next in step 704 the controller 112 determines the appropriate values for the zone boundary crossing fee 336, the registration fee 338, the movement credit 340, the credit limit 342 and the credit decay rate 344 as described above. Finally in step 908 the controller transmits values for the zone boundary crossing fee 336, the registration fee 338, the movement credit 340, the credit limit 342 and the credit decay rate 344 along with the message.

Figure 10:
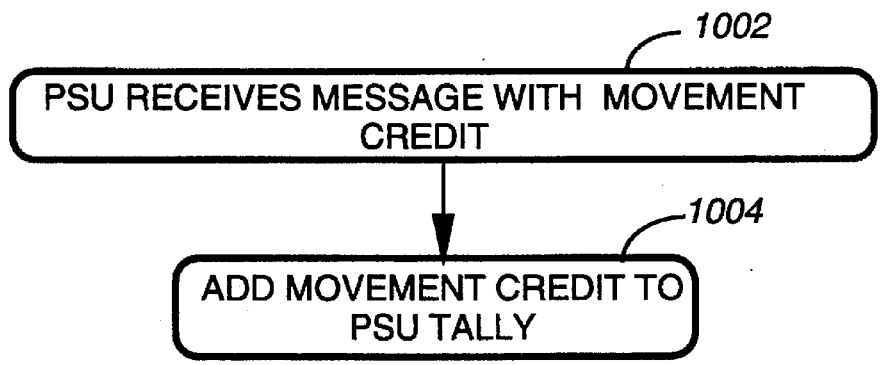
FIG. 10 is a flow chart depicting operation of the portable subscriber unit while receiving movement credit in accordance with the second embodiment of the present invention.

FIG. 10 is a flow chart 1000 depicting operation of the portable subscriber unit while receiving movement credit in accordance with the second embodiment of the present invention. In step 1002 the portable subscriber unit 122 receives a message along with the movement credit 340. Next, the processor 308 adds the received movement credits 340 to the tally 334.

Figure 11:
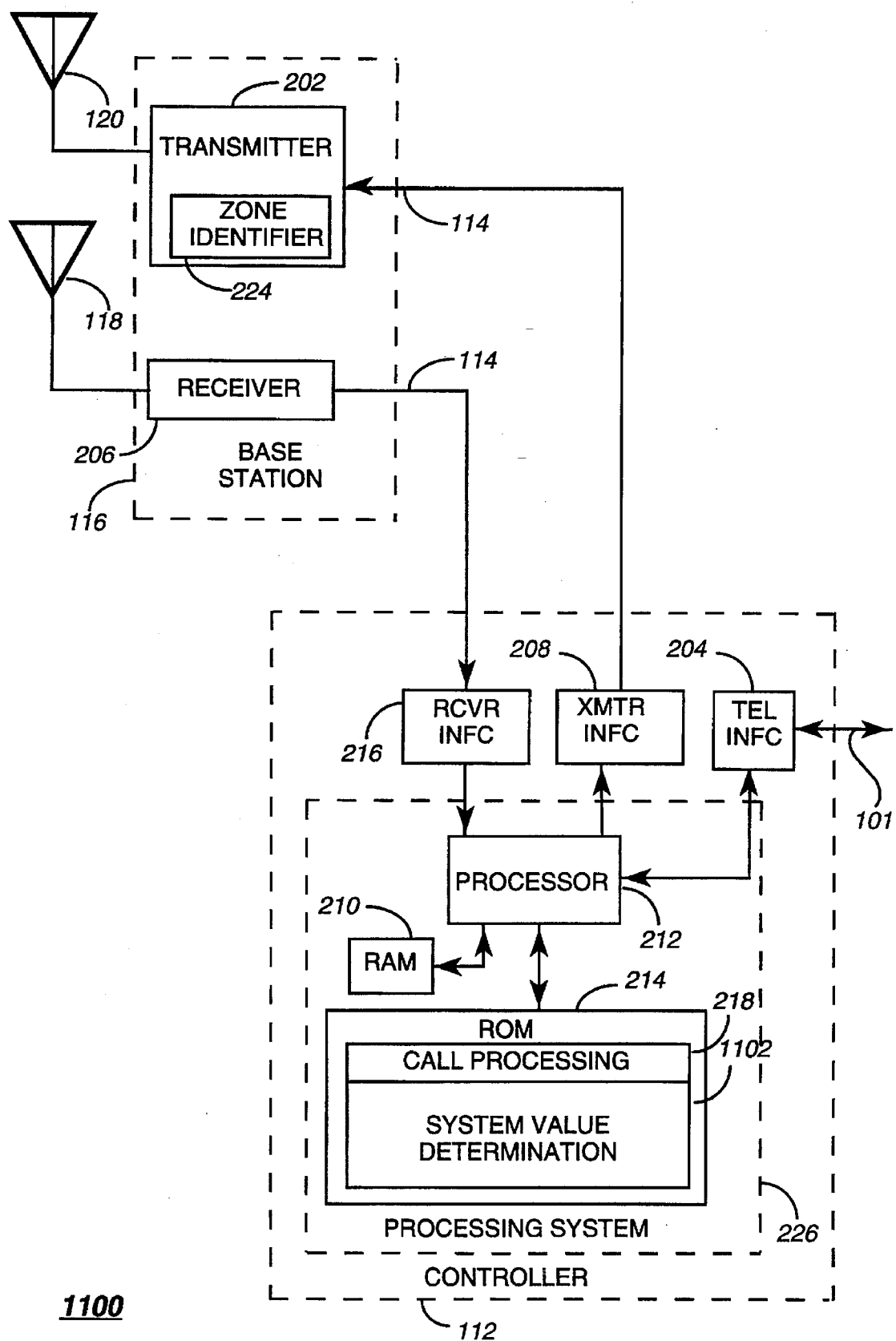
FIG. 11 is an electrical block diagram of portions of a controller and base station in accordance with a third embodiment of the present invention.
Figure 12:
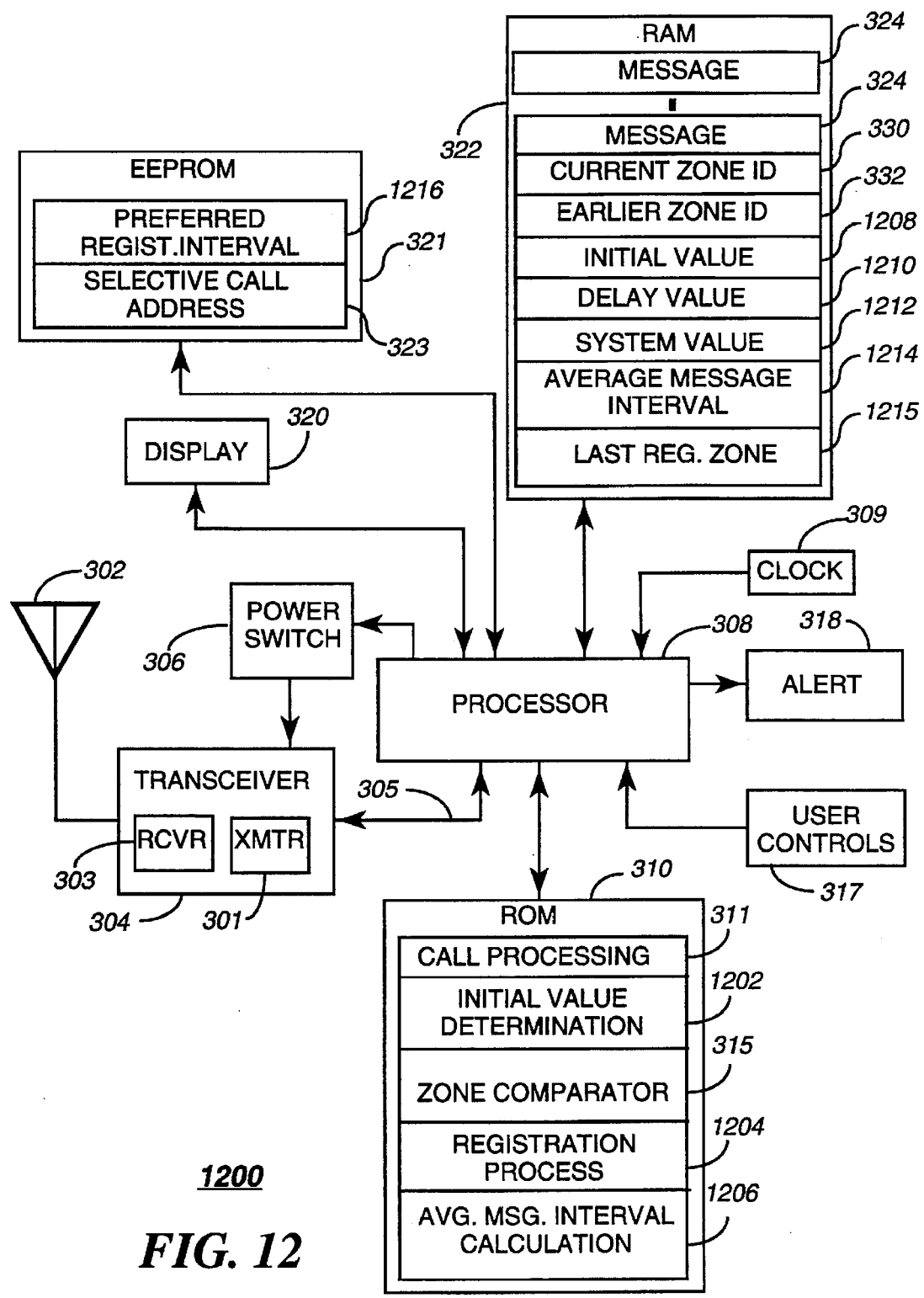
FIG. 12 is an electrical block diagram of a portable subscriber unit in accordance with the third embodiment of the present invention.

FIG. 11 is an electrical block diagram 1100 of portions of a controller and base station in accordance with a third embodiment of the present invention. The electrical block diagram 1100 is similar to the electrical block diagram 200, the essential difference being that a system value determination element 1102 replaces the dynamic movement fee determination element 220 and the credit granting element 222. Preferably, the system value determination element 1102 calculates a system value 1212 (FIG. 12) which the processor 212 then transmits to the portable subscriber unit 1200 (FIG. 12). The system value 1212 preferably is dependent upon system traffic, higher traffic resulting in a higher system value 1212. It will be appreciated that, alternatively, the system value 1212 can be a pre-programmed value that remains fixed. The system value 1212 is utilized by the portable subscriber unit 1200 for determining an initial value 1208 (FIG. 12) to be used for a registration timer delay value 1210 (FIG. 12), as will be explained below.

FIG. 12 is an electrical block diagram of the portable subscriber unit 1200 in accordance with the third embodiment of the present invention. The portable subscriber unit 1200 is similar to the portable subscriber unit 122, the essential differences being described as follows. First, in the EEPROM 321 a preferred registration interval 1216 has been added. Second, in the RAM 322 there are locations for storing registration variables, including the initial value 1208, the delay value 1210, the system value 1212, an average message interval 1214, and a last registration zone 1215. These registration variables replace other registration variables utilized in the first and second embodiments, such as the tally 334, the crossing fee 336, the registration fee 338, the movement credit 340, the credit limit 342, and the credit decay rate 344. Third, in the ROM 310 an initial value determination element 1202, a new registration process element 1204, and an average message interval calculation element 1206 have been added. These elements replace the fee processing element 314, and the registration process 316 of the first and second embodiments.

The preferred registration interval 1216 is a pre-programmed value which defines a preferred maximum delay after a zonal movement (i.e., crossing from one zone to another) before a zone registration is allowed. Preferably, the preferred registration interval 1216 is one of several factors considered in determining the initial value 1208 utilized in determining the delay value 1210, as will be described below. The delay value 1210 is a timer value utilized by the processor 308 in determining when to allow a zone registration. Preferably, the delay value 1210 starts at the initial value 1208 and is decremented to zero by the processor 308 in cooperation with the clock 309. When the delay value 1210 reaches zero, a zone registration is allowed. Under certain conditions, as described below, the processor 308 resets the delay value 1210 to the initial value 1208 before the delay value 1210 reaches zero. In addition, before registering, the processor 308 checks the last registration zone 1215 to prevent reregistering in the same zone in which the portable subscriber unit 1200 is already registered.

The system value 1212 is updated periodically from the fixed portion 102 of the system and is based upon system parameters, such as traffic intensity. For example, during periods of high traffic the fixed portion 102 can set the system value 1212 at a higher than normal value to reduce the registration traffic. Preferably, the system value 1212 is another one of several factors considered in determining the initial value 1208, as will be described below. The average message interval 1214 preferably is a running average, computed by the processor 308 in cooperation with the average message interval calculation element 1206. The processor 308 computes the average message interval 1214 as an average time between successive messages over a time period, e.g., one week (168 hours). For example, if the portable subscriber unit 1200 receives 20 messages in a week, the average message interval 1214 is 168/20=8.4 hours. Preferably, the average message interval 1214 is yet another one of several factors considered in determining the initial value 1208, as will be described below.

The initial value 1208 is determined by the processor 308 in cooperation with the initial value determination element 1202. Preferably, the initial value (IV) 1208 is a function of the system value (SV) 1212, the preferred registration interval (PRI) 1216, and the average message interval (AMI) 1214. A simple function that can be utilized for determining the initial value 1208 is, for example, $$IV = min(SV, PRI, (N \times AMI)),$$

where N is a predetermined normalization factor. By determining the initial value 1208 in such a manner, the system value 1212 advantageously can be utilized to reduce registration delay in times of low traffic and to increase registration delay in times of high traffic for a majority of subscribers on the system. Conversely, subscribers who receive a large number of messages or who have a lower PRI will be able to override the effect of the higher system value 1212 and will be able to maintain a more rapid registration response. It will be appreciated that, alternatively, other similar functions can be utilized for determining the initial value 1208 without departing from the scope and intent of the present invention.

Figure 16:
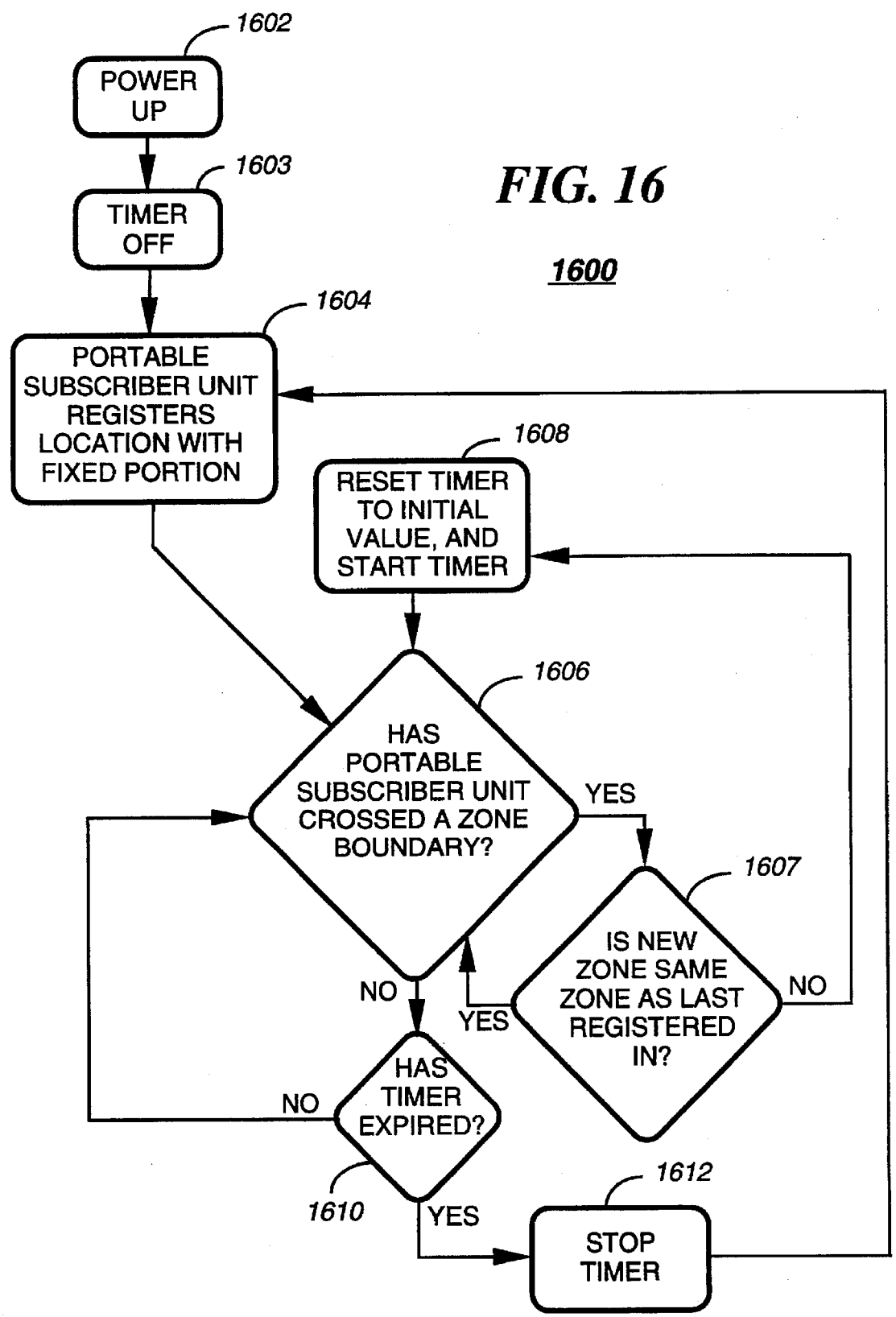
FIG. 16 is a flow chart depicting operation of the portable subscriber unit in accordance with the third embodiment of the present invention.

The registration process element 1204 cooperates with the processor 308 to determine whether and when a zone registration is made. Detailed operation of the registration process in accordance with the third embodiment of the present invention will be described below in the discussion of the flow chart 1600 (FIG. 16).

Figure 13:
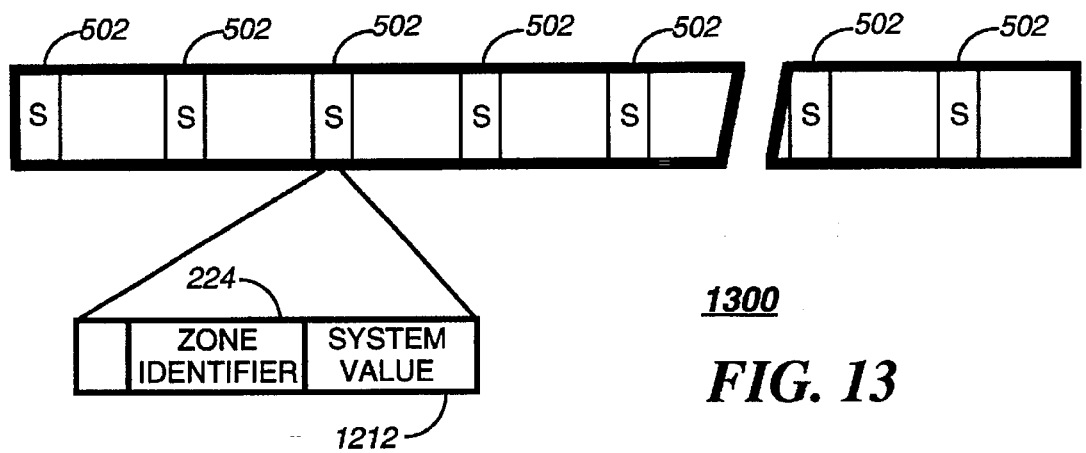
FIG. 13 is a timing diagram depicting events that occur during a transmission from the fixed portion in accordance with the third embodiment of the present invention.

FIG. 13 is a timing diagram 1300 depicting events that occur during a transmission from the fixed portion in accordance with the third embodiment of the present invention. The timing diagram 1300 is similar to the timing diagram 500, the essential differences being that the crossing fee 336, the registration fee 338, the movement credit 340, the credit limit 342, and the credit decay rate 344 have been replaced with a single parameter, the system value 1212.

Figure 14:
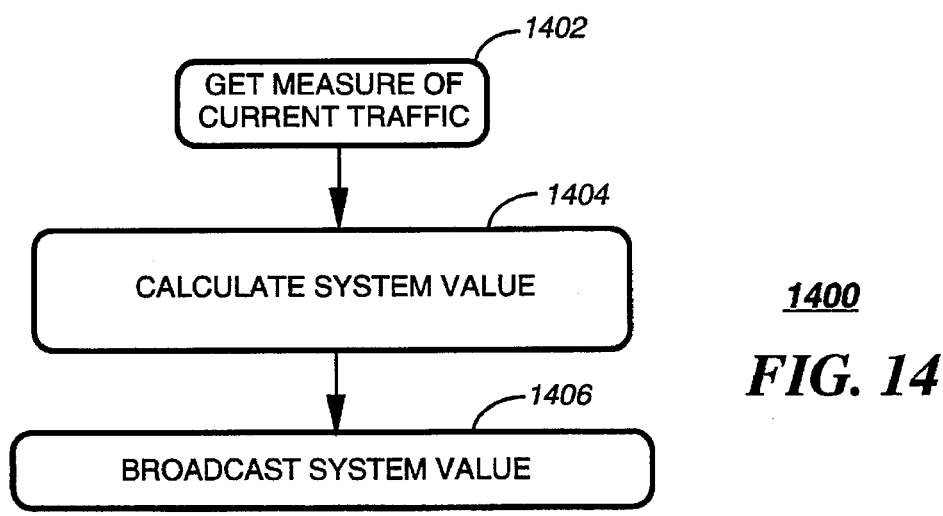
FIG. 14 is a flow chart depicting operation of the fixed portion while calculating and transmitting a system value in accordance with the third embodiment of the present invention.

FIG. 14 is a flow chart 1400 depicting operation of the fixed portion 102 while calculating and transmitting the system value 1212 in accordance with the third embodiment of the present invention. The flow chart begins with the processing system 226 determining 1402 a measure of the current traffic utilizing the system. The traffic measure preferably represents traffic averaged over a recent period, e.g., calls received during the past hour. From the traffic measure (TM) the processing system 226 calculates 1404 the system value (SV) 1212, preferably using the formula $$SV = K \times TM,$$

where K is a normalization factor that depends on system capacity. The fixed portion 102 then broadcasts 1406 the system value 1212 to the portable subscriber units 1200 throughout the system. It will be appreciated that, alternatively, other similar formulas can be used to calculate the system value 1212 without departing from the scope and intent of the present invention.

Figure 15:
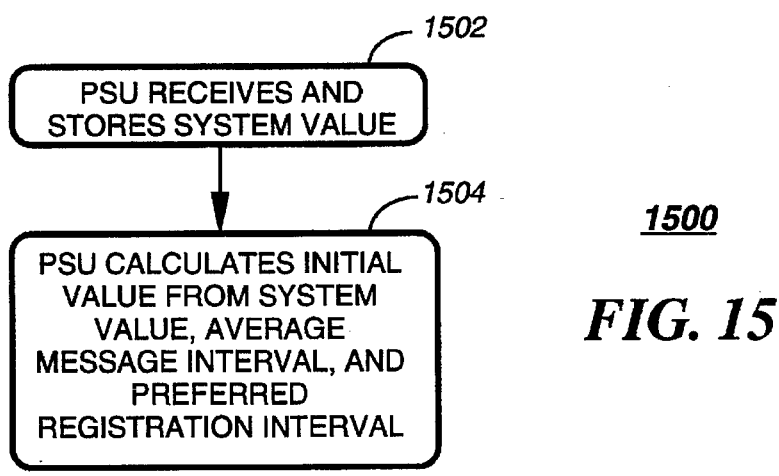
FIG. 15 is a flow chart depicting operation of the portable subscriber unit while calculating an initial value for a registration delay value in accordance with the third embodiment of the present invention.

FIG. 15 is a flow chart 1500 depicting operation of the portable subscriber unit 1200 while calculating the initial value 1208 for the registration delay value 1210 in accordance with the third embodiment of the present invention. The flow chart 1500 begins with the portable subscriber unit 1200 receiving 1502 and storing the system value 1212. Then the processor 308 calculates the initial value 1208, preferably as a function of the system value 1212, the preferred registration interval 1216, and the average message interval 1214, as described herein above.

FIG. 16 is a flow chart 1600 depicting operation of the portable subscriber unit 1200 in accordance with the third embodiment of the present invention. The flow begins with power up 1602 of the portable subscriber unit 1200. The processor 308 then temporarily disables 1603 a registration timer. The processor 308 then cooperates with the registration process element 1204 to register 1604 the location of the portable subscriber unit 1200 with the fixed portion 102 of the system. As part of the registration process, the processor 308 also replaces the last registration zone 1215 with the current zone ID 330. Next, the processor 308 cooperates with the zone comparator 315 to determine 1606 whether a zone boundary is subsequently crossed. If not, the processor cooperates with the registration process element 1204 to determine 1610 whether the registration timer has expired (i.e., the delay value 1210 has been reduced to zero). If not (or if the timer is turned off), the flow returns to step 1606 to determine whether a zone boundary has been crossed.

When a zone boundary is crossed, the flow moves to step 1607, where the processor 308 compares the current zone ID 330 with the last registration zone 1215, i.e., the zone in which the portable subscriber unit 1200 last registered. If the current zone ID 330 is the same as the last registration zone 1215, the flow returns to step 1606 to await another zone crossing. This advantageously prevents reregistering in a zone in which the portable subscriber unit 1200 is already registered. If, on the other hand, in step 1607 the current zone ID 330 is not the same as the last registration zone 1215, the flow moves to step 1608, where the registration timer is reset to the initial value 1208 and started. Flow then returns to loop between steps 1606 and 1610. Operation of the loop is such that if the timer expires before another zone boundary is crossed, then the processor 308 will stop 1612 the timer and then return to step 1604 to perform a zone registration. If, however, the timer does not expire before another zone boundary is crossed, then the timer (i.e., the delay value 1210) is reset to the initial value 1208. By delaying registration in this manner, the portable subscriber unit 1200 in accordance with the third embodiment of the present invention advantageously reduces unnecessary registrations when the portable subscriber unit 1200 is moving rapidly through a series of zones and when the portable subscriber unit 1200 is operating along a border between two zones. When the portable subscriber unit 1200 reaches its destination zone, the timer will expire, thereby allowing a zone registration to take place.

As discussed herein above, by computing the initial value 1208 as a function of the system value 1212, the preferred registration interval 1216, and the average message interval 1214, the controller 112 advantageously can reduce average system registration rate during high traffic periods, while allowing selected portable subscriber units 1200 having either a low preferred registration interval 1216 or a low average message interval 1214 to register more often than the other subscribers.

As can be seen from the above description, the present invention will advantageously control unnecessary system traffic associated with tracking of subscribers in a zoned communication system, through the described system of credits and fees, or, alternatively, through control of the registration delay. Controlling registrations and system wide searches in these manners will increase system capacity, reduce message delivery delays, enhance user satisfaction and contribute to the commercial success of the system.

What is claimed is:

1. A method of controlling zone registrations in a radio communication system providing radio coverage to a portable subscriber unit within a plurality of zones, the method comprising in a fixed portion of the radio communication system the steps of:
   granting to the portable subscriber unit a predetermined amount of a movement credit in response to an occurrence of a predetermined communication activity associated with the portable subscriber unit; and
   accepting a limited number of the zone registrations from the portable subscriber unit, the limited number determined by a tally of the movement credit granted to the portable subscriber unit, diminished by movement fees deducted in response to a zonal movement of the portable subscriber unit.

2. The method of claim 1, further comprising the step of
   defining as one of the movement fees a registration fee to be deducted from the tally of the movement credit in response to a zone registration by the portable subscriber unit, wherein the zone registration is allowed only if the tally of the movement credit is at least as large as the registration fee.

3. The method of claim 1, further comprising the step of defining as one of the movement fees a zone boundary crossing fee to be deducted from the tally of the movement credit in response to a zone boundary crossing by the portable subscriber unit, wherein the zone boundary crossing fee is deducted prior to evaluating allowability of making a zone registration.

4. The method of claim 1, wherein the predetermined communication activity comprises a receipt of a message for the portable subscriber unit by the fixed portion of the radio communication system.

5. The method of claim 1, further comprising the step of establishing at least one of the movement fees dynamically in response to at least one of communication traffic conditions within the radio communication system, time of day, and day of week.

6. A method of controlling zone registrations in a radio communication system providing radio coverage to a portable subscriber unit within a plurality of zones, the method comprising in the portable subscriber unit the steps of:

receiving a grant of a movement credit from a fixed portion of the radio communication system in response to an occurrence of a predetermined communication activity associated with the portable subscriber unit; and making a limited number of the zone registrations, the limited number determined by a tally of the movement credit granted to the portable subscriber unit, diminished by movement fees deducted in response to a zonal movement of the portable subscriber unit.

7. The method of claim 6, wherein the receiving step comprises the steps of:

receiving a message from the fixed portion; and in response, automatically adding a predetermined movement credit to the tally.

8. The method of claim 6, wherein the step of making a limited number of the zone registrations comprises the steps of:

maintaining the tally of the movement credit;

detecting a need to make a zone registration;

making a comparison between the tally of the movement credit and a registration fee required for making the zone registration;

making the zone registration in response to the comparison indicating that the tally is sufficient to pay the registration fee; and deferring the zone registration in response to the comparison indicating that the tally is insufficient to pay the registration fee.

9. The method of claim 8, wherein the detecting step comprises the step of determining that a zone boundary has been crossed by the portable subscriber unit, and wherein a zone boundary crossing fee is deducted from the tally of the movement credit prior to the step of making the comparison between the tally and the registration fee.

10. The method of claim 8, wherein at least one of the movement fees is established dynamically by the fixed portion of the radio communication system, and wherein the step of making a limited number of the zone registrations further comprises the step of periodically monitoring transmissions from the fixed portion of the radio communication system to receive updated movement fees.

11. The method of claim 10, wherein the step of making a limited number of the zone registrations further comprises the step of making a deferred registration in response to the zone registration having been deferred in the deferring step and the updated movement fees indicating that the tally of the movement credit is sufficient to pay the registration fee as currently updated.

12. A controller for controlling zone registrations in a radio communication system providing radio coverage to a portable subscriber unit within a plurality of zones, the controller comprising:

a processing system for controlling operation of the controller;

a transmitter interface coupled to the processing system for sending information including a message to the portable subscriber unit;

a receiver interface coupled to the processing system for receiving information including a zone registration from the portable subscriber unit, wherein the processing system is programmed for:

granting to the portable subscriber unit a predetermined amount of a movement credit in response to an occurrence of a predetermined communication activity associated with the portable subscriber unit; and accepting a limited number of the zone registrations from the portable subscriber unit, the limited number determined by a tally of the movement credit granted to the portable subscriber unit, diminished by movement fees deducted in response to a zonal movement of the portable subscriber unit.

13. The controller of claim 12, wherein the processing system is further programmed for defining as one of the movement fees a registration fee to be deducted from the tally of the movement credit in response to a zone registration by the portable subscriber unit, wherein the zone registration is allowed only if the tally of the movement credit is at least as large as the registration fee.

14. The controller of claim 12, wherein the processing system is further programmed for defining as one of the movement fees a zone boundary crossing fee to be deducted from the tally of the movement credit in response to a zone boundary crossing by the portable subscriber unit, wherein the zone boundary crossing fee is deducted prior to evaluating allowability of making a zone registration.

15. The controller of claim 12, wherein the predetermined communication activity comprises a receipt of the message for the portable subscriber unit by the controller.

16. The controller of claim 12, wherein the processing system is further programmed to establish at least one of the movement fees dynamically in response to at least one of communication traffic conditions within the radio communication system, time of day, and day of week.

17. A portable subscriber unit for controlling zone registrations in a radio communication system providing radio coverage to the portable subscriber unit within a plurality of zones, the portable subscriber unit comprising:

a receiver for receiving a grant of a movement credit from a fixed portion of the radio communication system in response to an occurrence of a predetermined communication activity associated with the portable subscriber unit;

a processor coupled to the receiver for receiving information including the grant of the movement credit therefrom;

a memory coupled to the processor for storing software and operating variables utilized by the processor, including a tally of the movement credit granted to the portable subscriber unit, diminished by movement fees deducted in response to a zonal movement of the portable subscriber unit; and a transmitter coupled to the processor for transmitting a zone registration message to the fixed portion of the radio communication system, wherein the processor is programmed for controlling the transmitter to make a limited number of the zone registrations, the limited number determined by the tally of the movement credit.

18. The portable subscriber unit of claim 17, wherein the processor is programmed for automatically adding a predetermined movement credit to the tally, in response to receiving a message from the fixed portion.

19. The portable subscriber unit of claim 17, wherein the processor is programmed for limiting the tally of the movement credit to a predetermined maximum amount of credit.

20. The portable subscriber unit of claim 17, wherein the processor is programmed for reducing the tally of the movement credit by a predetermined amount of credit per unit of time.

21. The portable subscriber unit of claim 17, wherein the processor is further programmed for:

maintaining the tally of the movement credit;

detecting a need to make a zone registration;

making a comparison between the tally of the movement credit and a registration fee required for making the zone registration;

making the zone registration in response to the comparison indicating that the tally is sufficient to pay the registration fee; and deferring the zone registration in response to the comparison indicating that the tally is insufficient to pay the registration fee.

22. The portable subscriber unit of claim 21, wherein the processor is further programmed for:

determining that a zone boundary has been crossed by the portable subscriber unit, and in response, deducting a zone boundary crossing fee from the tally of the movement credit prior to making the comparison between the tally and the registration fee.

23. The portable subscriber unit of claim 21, wherein at least one of the movement fees is established dynamically by the fixed portion of the radio communication system, and wherein the processor is further programmed for controlling the receiver to periodically monitor transmissions from the fixed portion of the radio communication system to receive updated movement fees.

24. The portable subscriber unit of claim 23, wherein the processor is further programmed for making a deferred registration in response to the zone registration having been deferred and the updated movement fees indicating that the tally of the movement credit is sufficient to pay the registration fee as currently updated.

25. A method of controlling zone registrations in a radio communication system providing radio coverage to a portable subscriber unit within a plurality of zones, the method comprising in the portable subscriber unit the steps of:

adjusting at least one registration variable in a memory of the portable subscriber unit for moderating the zone registrations; and moderating the zone registrations to a limited number in accordance with the at least one registration variable.

26. The method of claim 25, wherein the adjusting step comprises the step of receiving a grant of a movement credit from a fixed portion of the radio communication system in response to an occurrence of a predetermined communication activity associated with the portable subscriber unit, and wherein in the moderating step, the limited number is determined by a tally of the movement credit granted to the portable subscriber unit, diminished by movement fees deducted in response to a zonal movement of the portable subscriber unit.

27. The method of claim 26, wherein the receiving step comprises the steps of:

receiving a message from the fixed portion; and in response, automatically adding a predetermined movement credit to the tally.

28. The method of claim 26, wherein the moderating step comprises the steps of:

maintaining the tally of the movement credit;

detecting a need to make a zone registration;

making a comparison between the tally of the movement credit and a registration fee required for making the zone registration;

making the zone registration in response to the comparison indicating that the tally is sufficient to pay the registration fee; and deferring the zone registration in response to the comparison indicating that the tally is insufficient to pay the registration fee.

29. The method of claim 25, wherein the adjusting step comprises the step of setting a delay value to an initial value, and wherein the moderating step comprises the step of delaying execution of a zone registration for a period determined by the delay value, in response to a zonal movement of the portable subscriber unit.

30. The method of claim 29, wherein the moderating step comprises the step of restoring the delay value to the initial value, in response to another zonal movement of the portable subscriber unit.

31. The method of claim 29, wherein the adjusting step further comprises the steps of receiving a transmission from a fixed portion of the radio communication system, the transmission comprising a system value; and determining the initial value from the system value.

32. The method of claim 29, wherein the adjusting step further comprises the steps of:

calculating and storing an average message interval for the portable subscriber unit; and determining the initial value from the average message interval.

33. The method of claim 29, wherein the adjusting step further comprises the steps of:

pre-programming a preferred registration interval for the portable subscriber unit; and determining the initial value from the preferred registration interval.

34. A portable subscriber unit for controlling zone registrations in a radio communication system providing radio coverage to the portable subscriber unit within a plurality of zones, the portable subscriber unit comprising:

- a receiver for receiving information from a fixed portion of the radio communication system;
- a processor coupled to the receiver for processing the information;
- a memory coupled to the processor for storing software and operating variables utilized by the processor, including at least one registration variable; and
- a transmitter coupled to the processor for transmitting the zone registrations to the fixed portion of the radio communication system, wherein the processor is programmed for:
- adjusting the at least one registration variable for moderating the zone registrations; and
- moderating the zone registrations to a limited number in accordance with the at least one registration variable.

35. The portable subscriber unit of claim 34,
wherein for adjusting the at least one registration variable the processor is further programmed to grant a movement credit in response to an occurrence of a predetermined communication activity associated with the portable subscriber unit, and wherein for moderating the zone registrations the processor is further programmed to determine the limited number from a tally of the movement credit granted to the portable subscriber unit, diminished by movement fees deducted in response to a zonal movement of the portable subscriber unit.

36. The portable subscriber unit of claim 35, wherein in response to receiving a message from the fixed portion the processor is further programmed to automatically add a predetermined movement credit to the tally.

37. The portable subscriber unit of claim 35, wherein for moderating the zone registrations the processor is further programmed to:

maintain the tally of the movement credit;

detect a need to make a zone registration;

make a comparison between the tally of the movement credit and a registration fee required for making the zone registration;

make the zone registration in response to the comparison indicating that the tally is sufficient to pay the registration fee; and defer the zone registration in response to the comparison indicating that the tally is insufficient to pay the registration fee.

38. The portable subscriber unit of claim 34,
wherein for adjusting the at least one registration variable the processor is further programmed to:

set a delay value to an initial value, and wherein for moderating the zone registrations the processor is further programmed to delay execution of a zone registration for a period determined by the delay value, in response to a zonal movement of the portable subscriber unit.

39. The portable subscriber unit of claim 38,
wherein for moderating the zone registrations the processor is further programmed to restore the delay value to the initial value, in response to another zonal movement of the portable subscriber unit.

40. The portable subscriber unit of claim 38,
wherein for adjusting the at least one registration variable the processor is further programmed to:

receive a transmission from the fixed portion of the radio communication system, the transmission comprising a system value; and determine the initial value from the system value.

41. The portable subscriber unit of claim 38, wherein for adjusting the at least one registration variable the processor is further programmed to:

calculate and store an average message interval for the portable subscriber unit; and determine the initial value from the average message interval.

42. The portable subscriber unit of claim 38, wherein for adjusting the at least one registration variable the processor is further programmed access a pre-programmed preferred registration interval for the portable subscriber unit; and determine the initial value from the pre-programmed preferred registration interval.

43. A controller for controlling zone registrations in a radio communication system providing radio coverage to a portable subscriber unit within a plurality of zones, the controller comprising:

a processing system for controlling operation of the controller;

a transmitter interface coupled to the processing system for sending information including a message to the portable subscriber unit;

a receiver interface coupled to the processing system for receiving information including a zone registration from the portable subscriber unit, wherein the processing system is programmed to adjust at least one registration variable in a memory of the portable subscriber unit for moderating the zone registrations, wherein the at least one registration variable comprises a system value that determines a delay value for delaying execution of a zone registration for a period determined by the delay value, in response to a zonal movement of the portable subscriber unit.

* * * * *

UNITED STATES PATENT AND TRADEMARK OFFICE
CERTIFICATE OF CORRECTION

PATENT NO. : 5,666,652
DATED : September 9, 1997
INVENTOR(S) : Jyh-Han Lin, Jheroen Pieter Dorenbosch, Robert Gary Goodman, James Alan Starkweather It is certified that error appears in the above-indentified patent and that said Letters Patent is hereby corrected as shown below:

Claim 42, line 29, after the word "programmed" add --to:--

Signed and Sealed this

Eighteenth Day of August, 1998

Attest:

BRUCE LEHMAN

Attesting Officer

Commissioner of Patents and Trademarks